No. 653,169.  
C. J. COLEMAN.  
MOTOR VEHICLE.  
(Application filed Aug. 11, 1899.)  
(No Model.)  
Patented July 3, 1900.  
2 Sheets—Sheet 1.
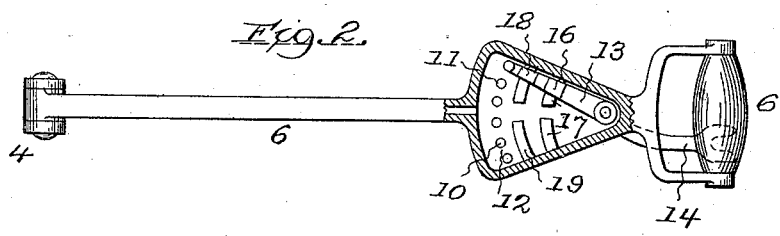
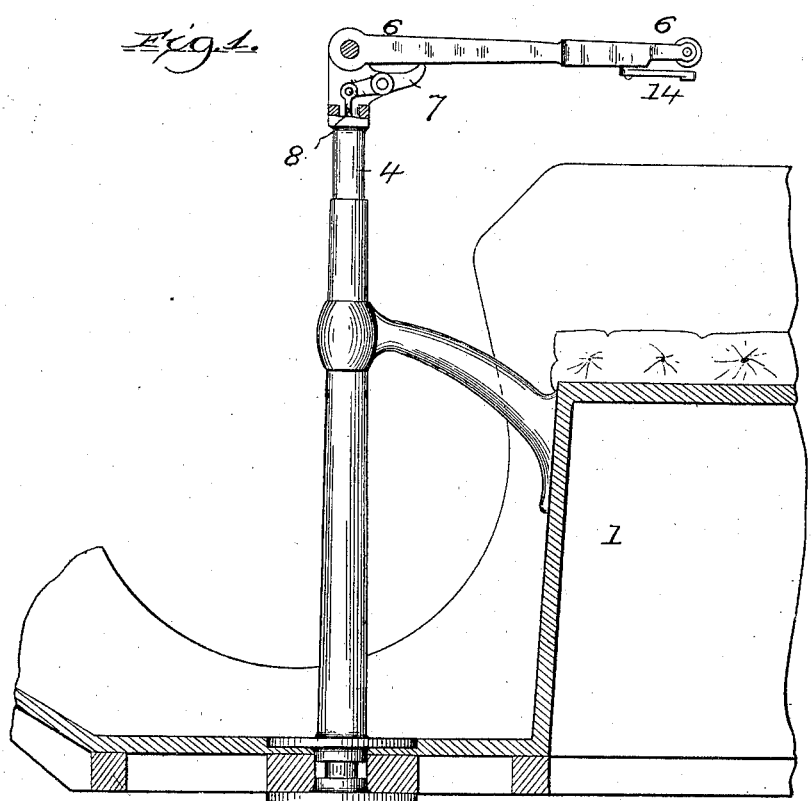

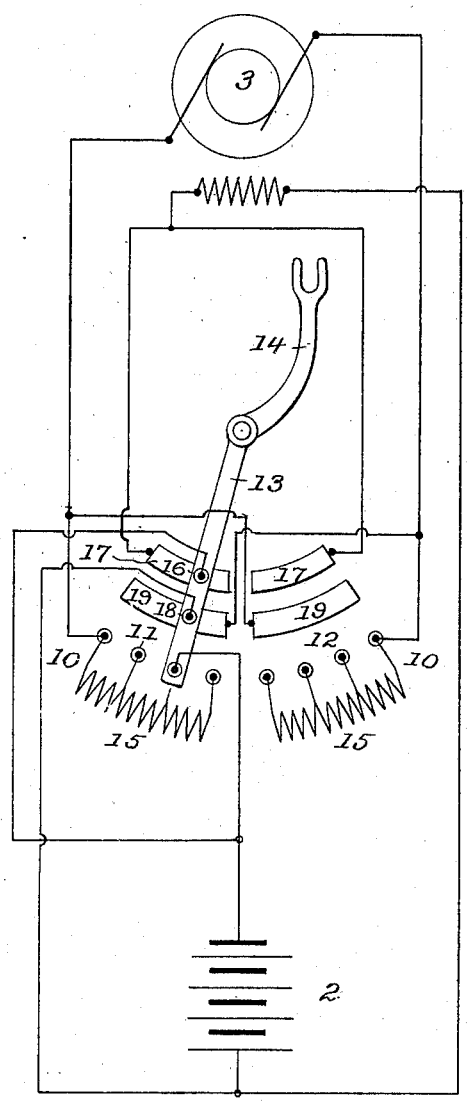

UNITED STATES PATENT OFFICE.

CLYDE J. COLEMAN, OF CHICAGO, ILLINOIS, ASSIGNOR TO THOMAS J. RYAN, OF NEW YORK, N. Y.

MOTOR-VEHICLE.

SPECIFICATION forming part of Letters Patent No. 653,169, dated July 3, 1900.

Application filed August 11, 1899. Serial No. 726,932. (No model.)

*To all whom it may concern:*

Be it known that I, CLYDE J. COLEMAN, a citizen of the United States, residing at Chicago, in the county of Cook and State of Illinois, have invented certain new and useful Improvements in Motor-Vehicles; and I do hereby declare the following to be a full, clear, and exact description of the same, reference being had to the accompanying drawings, forming a part of this specification.

The present invention relates to a combined controlling, brake-actuating, and steering mechanism for electrically-propelled motor-vehicles.

The object of the present improvement is to provide a durable, effective, and convenient combination and arrangement of the manually-actuated elements or portions of the current-controlling, brake-actuating, and steering mechanisms of electrically-propelled vehicles within common and independent control or manipulation by the one hand of the operator, all as will hereinafter more fully appear, and be more particularly pointed out in the claims.

In the accompanying drawings, illustrative of the present invention, Figure 1 is a fragmentary longitudinal section of the seat portion of a motor-vehicle, illustrating the general arrangement of the steering, braking, and current-controlling mechanisms of the present invention; Fig. 2, a detail plan view of the same with parts in section; Fig. 3, a diagram view illustrating the circuit connection of the present current controlling and reversing mechanism with the battery and motor.

Similar numerals of reference indicate like parts in the different views.

Referring to the drawings, 1 represents the seat portion of the motor-vehicle, 2 the storage-battery or other source of electric energy, and 3 the electric motor, by which the vehicle is propelled.

4 is the vertical rock-shaft or steering-stem of the steering mechanism journaled in suitable bearings on the vehicle-body, its lower end being provided with a lateral arm 5, that has operative connection with the front axle of the vehicle, while its upper end is provided with a horizontally-arranged lever or handle 6, arranged convenient to the operator and affording means for operating the steering mechanism, as usual in motor-vehicles.

The first part of the present invention involves the combination, with the steering lever or handle, of a brake-actuating mechanism having operative connection with said steering-handle and adapted to be actuated by a movement of said handle that is independent of the usual steering movement of such handle, yet capable of being imparted to said handle by the hand of the operator employed in steering the vehicle. In the construction shown in Figs. 1 and 2 of the accompanying drawings as illustrative of this part of the present invention the handle 6 is journaled at the upper end of the vertical steering-stem 4, so as to be capable of a movement in a vertical plane independent of its usual movement in a horizontal plane to attain a steering of the vehicle. 7 is an intermediate lever pivoted to the steering-stem 4, with one end having operative connection with the operating-handle 6, while the other end is connected to the pull-rod 8, that passes axially down through the hollow steering-stem 4, and at its lower end is connected to a bell-crank lever 9 or other like intermediate connection of the brake mechanism of the vehicle. With such construction a very convenient combination of the steering and braking means of the vehicle is afforded and in which combination the action of the one can be attained without interfering in the least with the other and with even greater rapidity, certainty, and convenience than where they are not so combined in that the hand of the operator is not required to be changed from one operating part to another different operating part, as usual to such type of mechanisms heretofore employed in motor-vehicles. A further advantage of the present combination lies in the fact that both mechanisms can be simultaneously operated by one hand of the operator when so desired.

Another part of the present invention involves, broadly, the combination, with the steering-handle of current-controller, of a combined current controller and reverser the operative connections of which are extended to within convenient relation to the operating-grip of the steering-handle, so as to be capable of convenient operation by the same hand of the operator having hold of the steering handle or lever. In the construction shown in Figs. 1 and 2 of the drawings illustrative of this part of the present invention 10 is the stationary member of the combined current controller and reversing switch, formed by a duplicate series of insulated contacts 11 and 12, having a segmental arrangement concentric with the pivot-axis of the movable member of the mechanism. In the present construction a gap is left between the two series of insulated contacts 11 and 12, so that with the movement of such movable member of the controller onto said gap the motive current will be broken, and a further continued movement of said movable member or contact-finger will effect a reversal of the motive current from that which had previously prevailed, the motive circuit being properly cross-connected in manner illustrated in diagram view, Fig. 3, to enable such reversal of the motive current to take place.

13 is the movable member or contact-finger of the combined current controller and reversing switch of any usual and well-known type, preferably a pivoted contact-finger 13, the pivot-pin of which extends outside the casing of the controller, &c., and is provided with an operating thumb or finger piece 14, that extends into adjacent relation to the grip portion of the steering-handle, so as to be capable of ready, convenient, and rapid operation by the hand of the operator while grasping the steering-handle.

15 are rheostats or variable resistances the coils of which are connected in series with the pairs of insulated contacts 11 and 12, of the controller and reversing switch, and which rheostats are adapted by the shifting of the contact-finger 13 to introduce a variable resistance into the motive circuit, as usual to such type of electrical appliances. In cases where an arrangement of the batteries is depended upon to afford a variable electromotive force and current such batteries will be connected to the current controller and reverser in any usual and well-known manner, so as to be able to control the same in multiple and in series multiple at the will of the operator, and accordingly the term "current-controller" in the present description is intended to cover, broadly, a means for controlling in a variable manner the electromotive force of the electrical circuit of the vehicle regardless of the particular arrangement and connection of such circuit and regardless of the fact that the circuit to the field or to the armature of the vehicle-motor is the circuit which is reversed in effecting a reversal of said motor with the present invention.

16 is an insulated contact-piece carried by the movable member 13 of the controller and connected with one pole of the battery. 17 represents fixed segmental contact-plates connected, through the field of the motor, with the other pole of the battery. Such contact-plates 17 and the contact-piece 16 are adapted to maintain the current upon the field of the motor at all times, except when the current-controller has broken the circuit to the armature of the motor, when the circuit to the field will also be broken.

18 is an insulated contact piece or finger carried by the operating lever or handle 5 of the current-controller and connected to the pole of the battery 2 opposite to that which the contact-finger of the variable resistance, heretofore described, is connected.

19 are segmental contact-plates adapted to have contact with the contact-finger 18 and cross-connected, as illustrated in diagram view, Fig. 4, to the pair of sectional contact-bars 4 of the variable resistance in order to permit of the reversal of the motor-current, as heretofore described.

Having thus fully described my said invention, what I claim as new, and desire to secure by Letters Patent, is—

1. In a motor-vehicle, the combination of a steering-handle having a combined horizontal and vertical movement, and a disconnected brake-actuating mechanism having operative connection with said steering-handle and adapted to be actively actuated by a downward movement of the steering-handle, substantially as set forth.

2. In an electrically-propelled vehicle, the combination of a steering-handle, a combined current controller and reversing switch, and means capable of independent actuation carried by the steering-handle within easy reach of the operator's hand and having operative connection with the controller, substantially as set forth.

3. In an electrically-propelled vehicle, the combination of a steering-handle, a combined current controller and reversing switch carried by said steering-handle, and means extending into adjacent relation to the grip portion of said handle and adapted to operate the controller, substantially as set forth.

4. In an electrically-propelled vehicle, the combination of a steering-handle, a combined current controller and reversing switch, carried by said steering-handle, and comprising a pair of segmentally-arranged series of stationary contact-points, and a movable contact-finger, and means extending into adjacent relation to the grip portion of said handle and adapted to operate the movable contact-finger, substantially as set forth.

5. In an electrically-propelled vehicle, the combination of a steering-handle having a combined horizontal and vertical movement, a brake-actuating mechanism having operative connection with said steering-handle, a combined current controller and reversing switch, and means capable of independent actuation carried by the steering-handle within easy reach of the operator's hand and having operative connection with the controller, substantially as set forth.

6. In an electrically-propelled vehicle, the combination of a steering-handle having a combined horizontal and vertical movement, a brake-actuating mechanism having operative connection with said steering-handle, a combined current controller and reversing switch, carried by said steering-handle, and means extending into adjacent relation to the grip portion of the handle and adapted to operate the controller, substantially as set forth.

7. In an electrically-propelled vehicle, the combination of a steering-handle having a combined horizontal and vertical movement, a brake-actuating mechanism having operative connection with said steering-handle, a combined current controller and reversing switch carried by said steering-handle and comprising a pair of segmentally-arranged series of stationary contact-points, and a movable contact-finger, and means extending into adjacent relation to the grip portion of said handle and adapted to operate the movable contact-finger, substantially as set forth.

In testimony whereof witness my hand this 8th day of August, 1899.

CLYDE J. COLEMAN.

In presence of—
 ROBERT BURNS,
 JAMES LAVALLIN.